United States Patent Office.

ADOLPH OTT, OF NEW YORK, N. Y., ASSIGNOR TO NEW YORK METAL AND CHEMICAL MANUFACTURING COMPANY, OF SAME PLACE.

Letters Patent No. 112,839, dated March 21, 1871.

IMPROVEMENT IN PREPARING TIN SALTS FROM TINNERS' WASTE.

The Schedule referred to in these Letters Patent and making part of the same.

I, ADOLPH OTT, of New York, county and State of New York, have invented a certain Process for Manufacturing Tin Salts from Tinners' Waste, of which the following is a specification.

Take the clippings, such as are produced in the manufacture of tin-ware, put them into a wooden tub and cover them with hydrochloric or muriatic acid of half the strength of the commercial acid, (two hundred and fifteen pounds of hydrochloric acid of the specific weight of 1.20 being required for one ton of clippings,) and heat the liquid by the introduction of steam. When the tin is all dissolved remove the clippings from the acid bath and wash them with slightly alkaline water. Immerse hereupon fresh clippings into the bath until the acid ceases to take up more tin. Draw now the liquid of protochloride or muriate of tin off, and evaporate it, by means of steam, in earthenware or leaden vessels until indicating a strength of 60° of Baumè's hydrometer.

In order to free this solution from the iron, which, though present in minute quantities, affects its properties, I convert it into bichloride of tin, or the fuming liquor of libavius, by heating one hundred pounds of the above-concentrated liquid with fifty pounds of muriatic acid of the specific weight of 1.15, thirty pounds of sulphuric acid of the specific weight of 1.80, and add gradually fifteen pounds of niter. This liquid is distilled in a leaden still, whereby the chloride of iron will remain in the still, while pure bichloride of tin ($SnCl_2$) is distilling over. This bichloride of tin is reconverted into chloride of tin, ordinarily called tin salt, by heating it either in earthenware or leaden vessels by the introduction of steam, forty-five pounds of finely-granulated Banca tin being requisite for one hundred pounds of the fuming liquid. From one ton of clippings of two thousand pounds three hundred and fifty-seven pounds of chloride of tin will thus be produced.

Instead of immersing the clippings into a bath of muriatic acid, a mixture of one part in weight of nitric acid, four parts of muriatic acid, and one-fifth part of sal ammoniac may be taken, one hundred and eighty pounds of muriatic acid of the specific weight of 1.20 being required for this operation, the other chemicals being taken in proportion to this quantity.

Claim.

I claim as my invention—

The process of preparing tin salts from tinners' waste, substantially as described.

ADOLPH OTT.

Witnesses:
   THO. F. WELLS,
   SAMUEL BRACKETT.